United States Patent [19]
Nakajima

[11] Patent Number: 6,104,829
[45] Date of Patent: *Aug. 15, 2000

[54] IMAGE PROCESSING APPARATUS AND METHOD WHICH FORMS A COLOR IMAGE CORRESPONDING TO MAPPED IMAGE DATA IN ACCORDANCE WITH AN IMAGE FORMING METHOD SELECTED FROM A PLURALITY OF IMAGE FORMING METHODS SET IN ACCORDANCE WITH A PLURALITY OF COLOR GAMUTS

[75] Inventor: Nobuyuki Nakajima, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,521

[22] Filed: Oct. 20, 1997

Related U.S. Application Data

[63] Continuation of application No. 08/421,947, Apr. 13, 1995, abandoned.

[30] Foreign Application Priority Data

Apr. 18, 1994  [JP]  Japan .................................. 6-079029

[51] Int. Cl.[7] ........................................................ G06K 9/00
[52] U.S. Cl. ................................................ 382/167; 358/518
[58] Field of Search ................................... 382/162, 166, 382/167, 239, 302; 358/518–523, 401, 501, 502, 527; 347/40, 41, 43; 395/109; 707/527, 528; 345/153, 154

[56] References Cited

U.S. PATENT DOCUMENTS

| | | | |
|---|---|---|---|
| 4,614,967 | 9/1986 | Sayanagi | 358/500 |
| 4,731,662 | 3/1988 | Udagwawa et al. | 358/75 |
| 4,758,885 | 7/1988 | Sasaki et al. | 358/80 |
| 5,282,046 | 1/1994 | Yamaguchi | 358/296 |
| 5,319,473 | 6/1994 | Harrington | 358/501 |
| 5,367,387 | 11/1994 | Yamaguchi | 358/518 |
| 5,383,055 | 1/1995 | Sacanuma et al. | 358/521 |
| 5,428,377 | 6/1995 | Stoffel et al. | 347/15 |
| 5,432,906 | 7/1995 | Newman et al. | 395/162 |
| 5,448,379 | 9/1995 | Ishihara et al. | 358/518 |
| 5,477,246 | 12/1995 | Hirabayashi et al. | 347/43 |
| 5,500,661 | 3/1996 | Matsubara et al. | 347/43 |

*Primary Examiner*—Bhavesh Mehta
*Attorney, Agent, or Firm*—Fitzpatrick, Cella, Harper & Scinto

[57] ABSTRACT

An image processing apparatus and an image processing method realize an optimum color reproduction and as a result provide an ideal output by selectively using color processing methods including color gamut compression in accordance with the output method in the apparatus.

22 Claims, 20 Drawing Sheets

| PRINT MODE | RECORDING MEDIUM | COLOR PROCESSING METHOD |
|---|---|---|
| DRAFT | PLAIN | CPM1 |
|  | COAT | CPM2 |
|  | OHP | CPM3 |
| NORMAL | PLAIN | CPM4 |
|  | COAT | CPM5 |
|  | OHP | CPM6 |
| QUALITY | PLAIN | CPM7 |
|  | COAT | CPM8 |
|  | OHP | CPM9 |

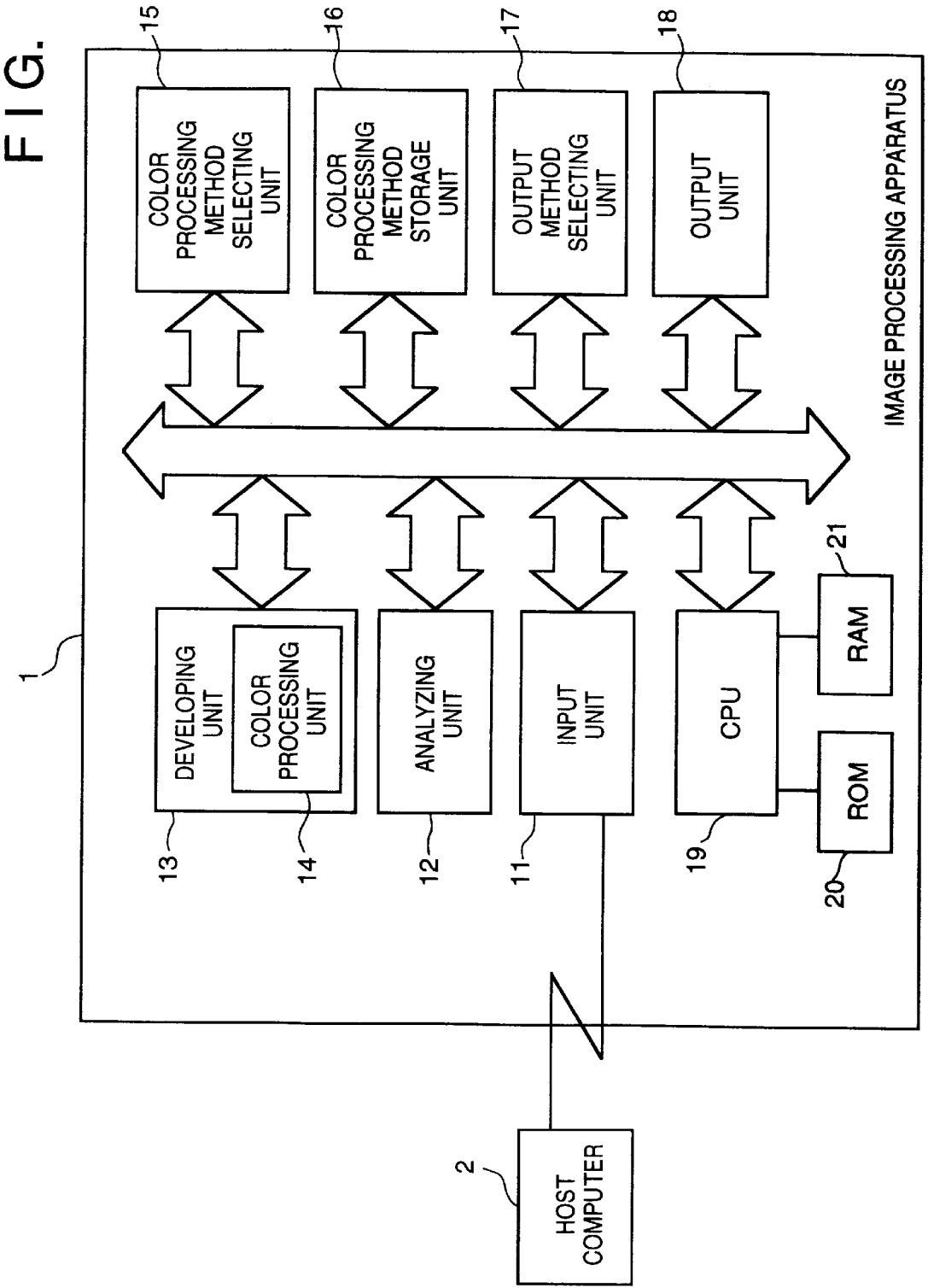

FIG. 3
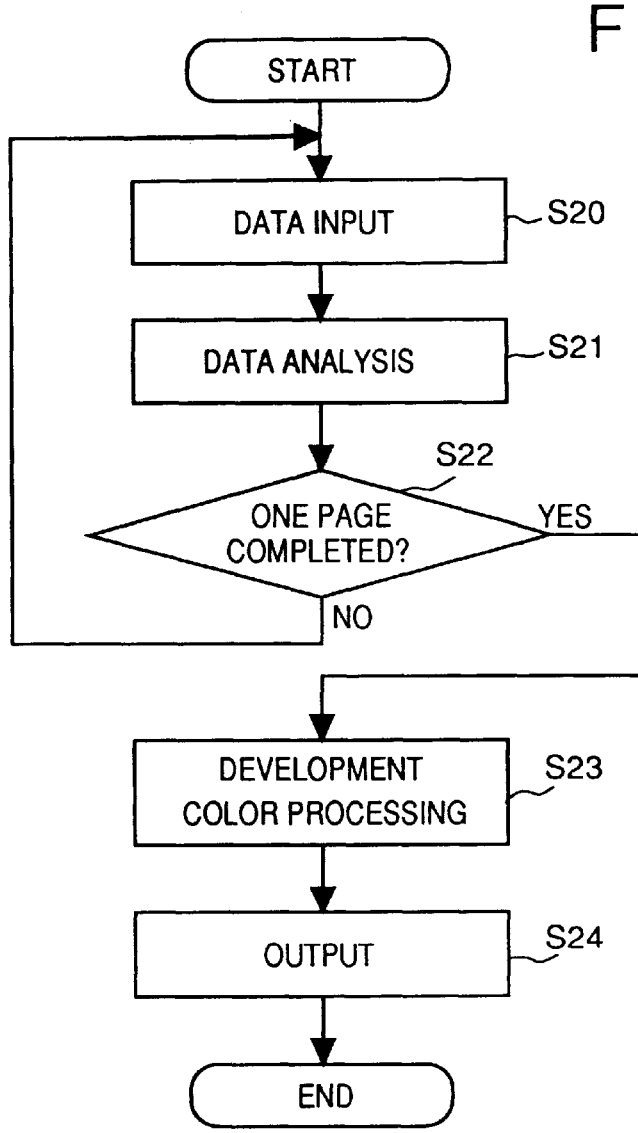
FIG. 4
PRINT MODE
DESIGNATION COMMAND
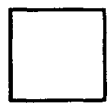
PRINT MODE
00 : NORMAL
01 : DRAFT
02 : QUALITY

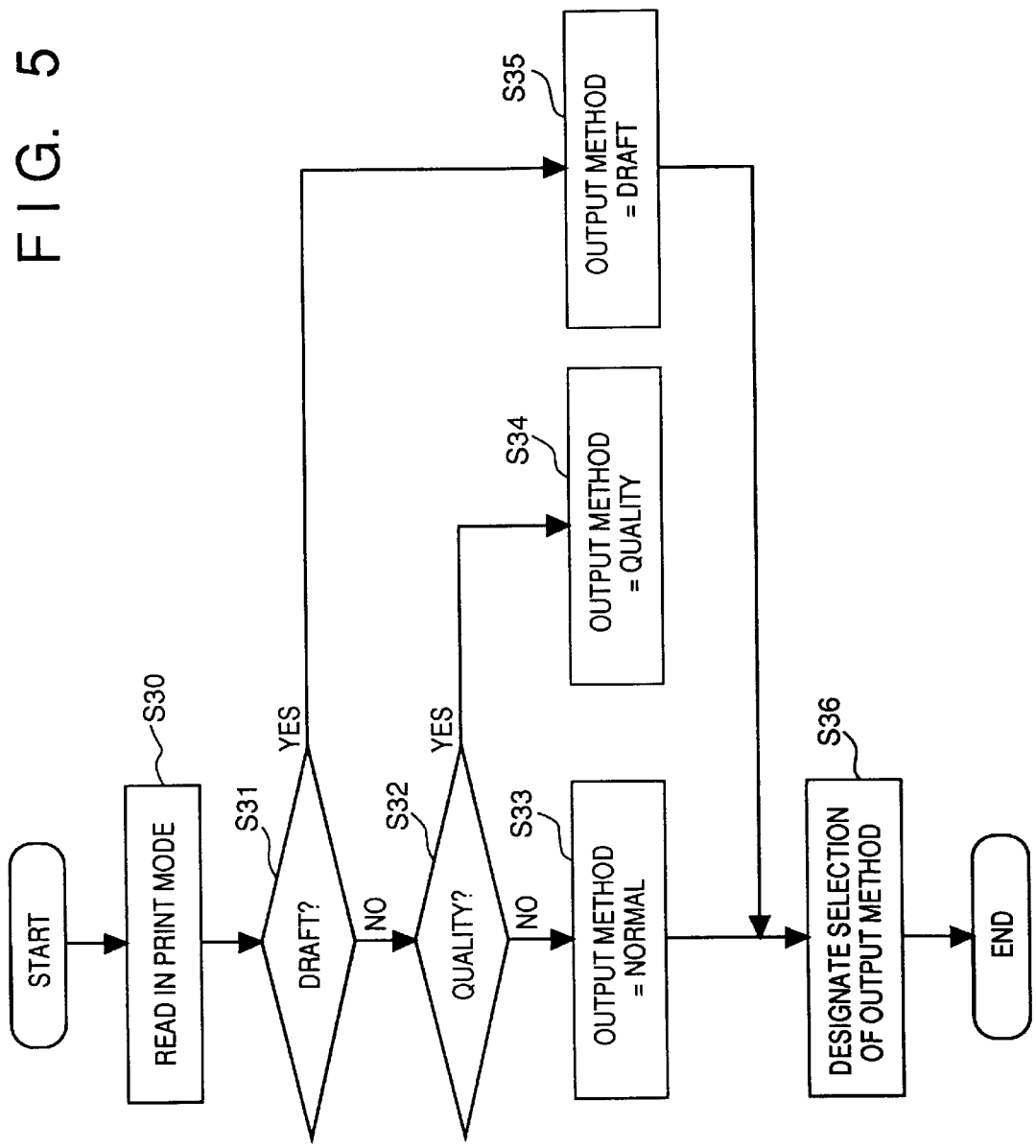

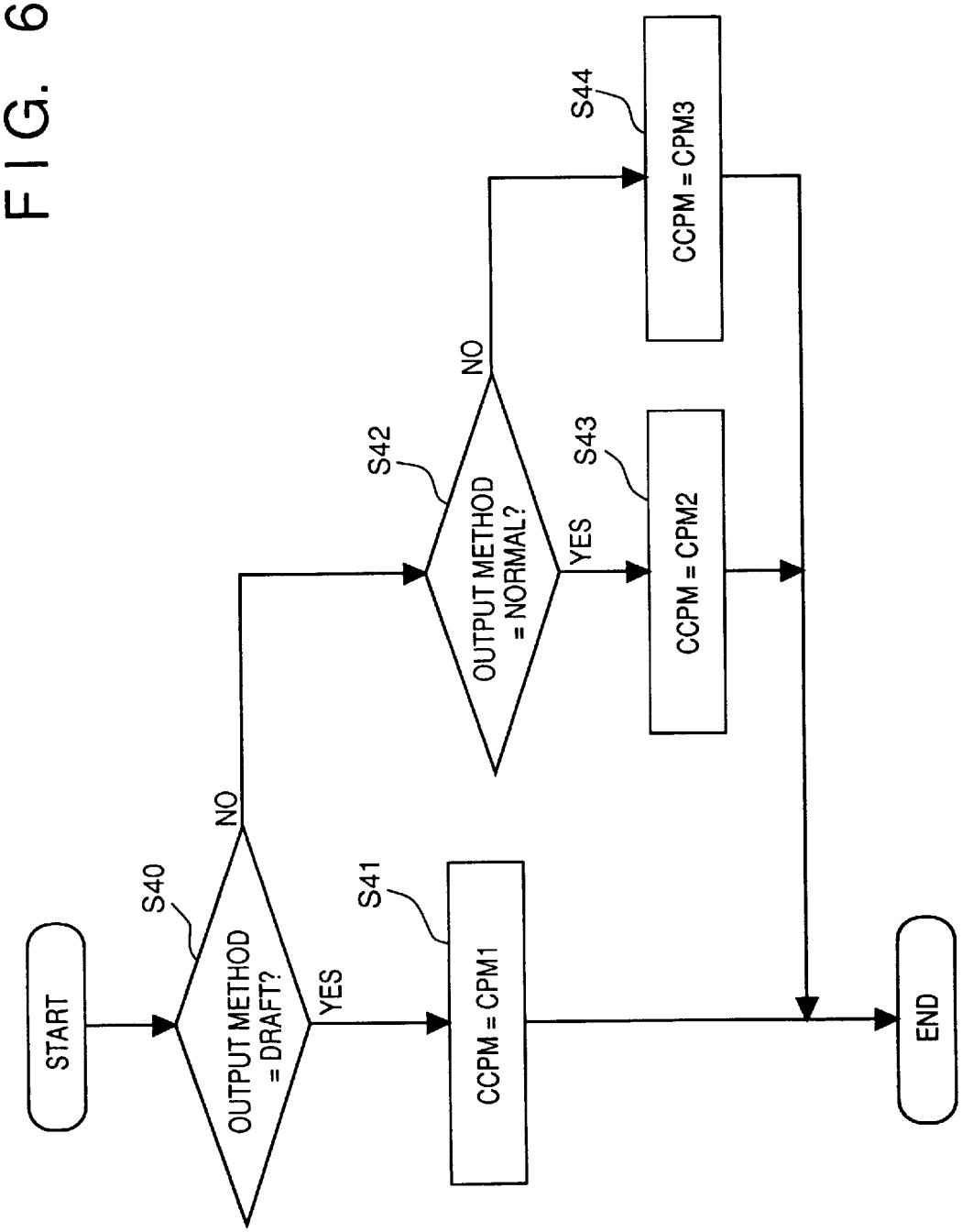

| PRINT MODE | RECORDING MEDIUM | COLOR PROCESSING METHOD |
|---|---|---|
| DRAFT | PLAIN | CPM1 |
| | COAT | CPM2 |
| | OHP | CPM3 |
| NORMAL | PLAIN | CPM4 |
| | COAT | CPM5 |
| | OHP | CPM6 |
| QUALITY | PLAIN | CPM7 |
| | COAT | CPM8 |
| | OHP | CPM9 |

FIG. 12
RECORDING MEDIUM
DESIGNATION COMMAND
MEDIA MODE
00 : PLAIN
01 : COAT
02 : OHP
FIG. 13
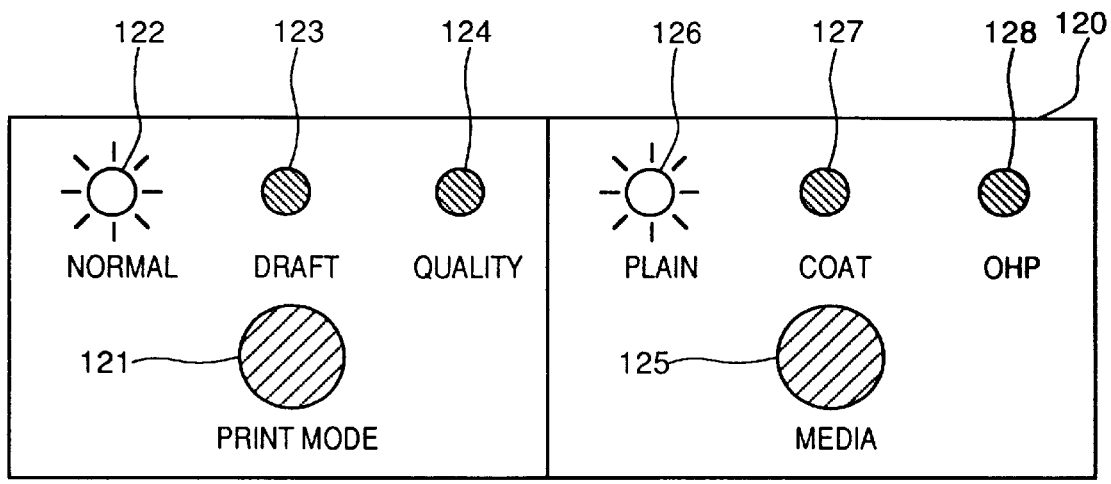

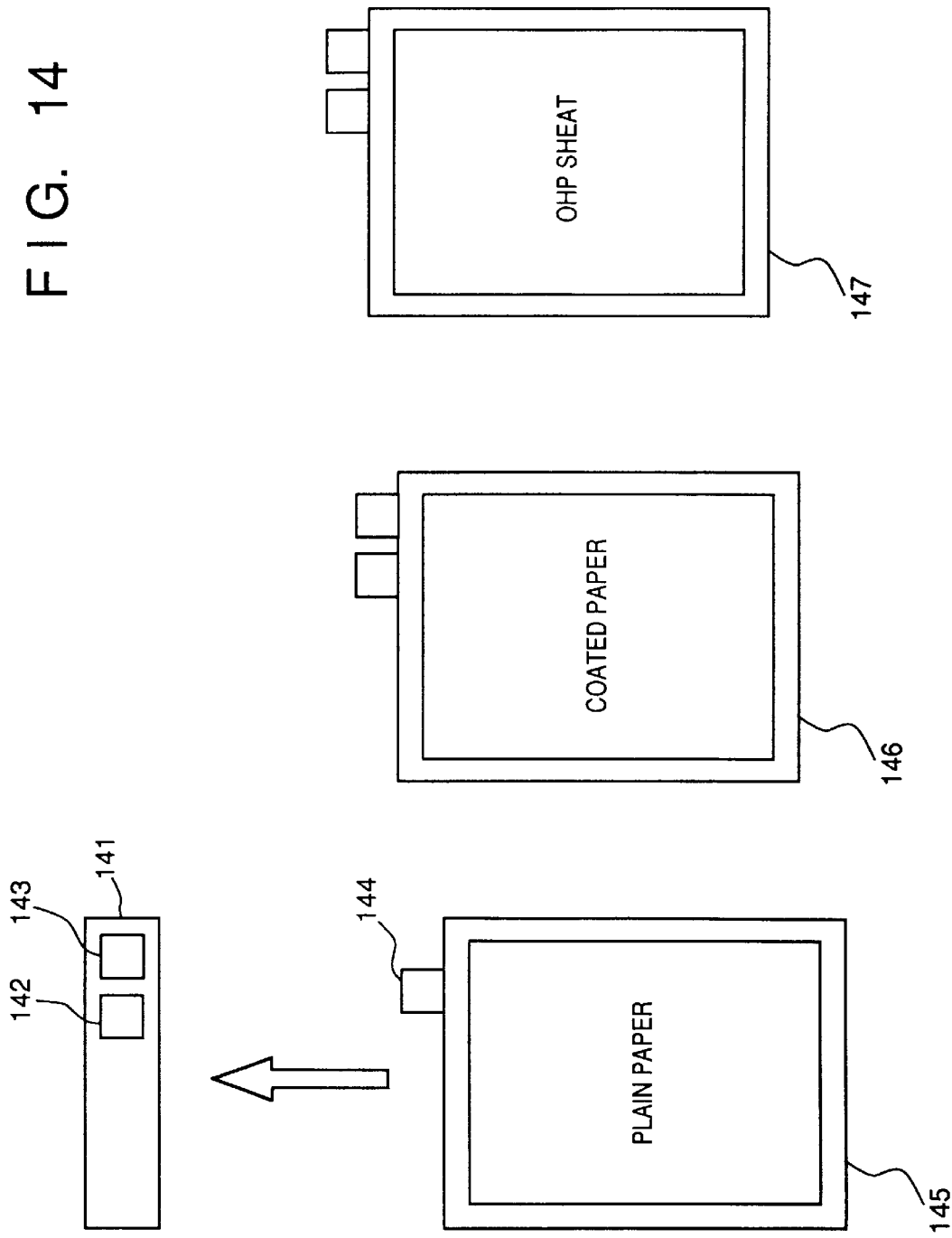

FIG. 17A $C' = \log R$ $M' = \log G$ $Y' = \log B$ $K = \min(C', M', Y')$ $C = C' - K$ $M = M' - K$ $Y = Y' - K$

FIG. 17B $$\begin{pmatrix} C \\ M \\ Y \\ K \end{pmatrix} = \begin{pmatrix} a_{11} & \cdots & a_{1n} \\ \vdots & & \vdots \\ a_{n1} & \cdots & a_{nn} \end{pmatrix} \begin{pmatrix} R \\ G \\ B \\ 1 \end{pmatrix}$$

FIG. 26

| PRINT MODE | RECORDING MEDIUM | COLOR GAMUT |
|---|---|---|
| DRAFT | PLAIN | GAMUT 1 |
| | COAT | GAMUT 2 |
| | OHP | GAMUT 3 |
| NORMAL | PLAIN | GAMUT 4 |
| | COAT | GAMUT 5 |
| | OHP | GAMUT 6 |
| QUALITY | PLAIN | GAMUT 7 |
| | COAT | GAMUT 8 |
| | OHP | GAMUT 9 |

IMAGE PROCESSING APPARATUS AND METHOD WHICH FORMS A COLOR IMAGE CORRESPONDING TO MAPPED IMAGE DATA IN ACCORDANCE WITH AN IMAGE FORMING METHOD SELECTED FROM A PLURALITY OF IMAGE FORMING METHODS SET IN ACCORDANCE WITH A PLURALITY OF COLOR GAMUTS

This application is a continuation of application Ser. No. 08/421,947 filed Apr. 13. 1995, now abandoned.

BACKGROUND OF THE INVENTION

The present invention relates to an image processing apparatus and an image processing method which perform color processing for input image data.

Generally, conventional image processing apparatuses represented by printers which form images on the basis of input color image data receive RGB signals as color signals for a monitor, performs color processing for the RGB signals, and converts the signals into CMYK signals as output color signals for a printer.

An example of the color processing performed by a conventional, general image processing apparatus is described below with reference to FIG. 18. FIG. 18 is a block diagram showing the detailed arrangement of a color processor for performing color processing in the image processing apparatus. In FIG. 18, multivalue data as input values which are expressed by an RGB color system are applied to a color converting unit 80. The color converting unit 80 converts the data into CMYK multivalue signals by color conversion processing. This color conversion processing performed by the color converting unit 80 is described later. The output CMYK multivalue signals from the color converting unit 80 are applied to a binarizing unit 81, where the signals are converted to CMYK binary signals in the form by which an output unit outputs the data.

As discussed above, the color processing in a conventional image processing apparatus is to convert input multivalue signals expressed by the RGB color system into CMYK binary signals which an output unit uses to output the data.

In a conventional image processing apparatus of the above type, one problem which arises when color reproduction is actually performed is the difference between the range of the color reproducibility of the input side and that of tie output side. For example, a monitor is a light-emitting device which reproduces colors by performing an additive process for light-source R, G, and B signals, whereas a printer is a device which reproduces colors by performing a subtractive process for C, M, Y, and K inks.

The subtractive process is described with reference to FIG. 19. In FIG. 19, reference numeral 150 denotes the surface of a recording medium; 151, 152, 153, and 154, inks of K (black), C (cyan), M (magenta), and Y (yellow), respectively; and 155 and 156, incident light and reflected light to and from the paper surface 150. As illustrated in FIG. 19, in an image processing apparatus such as a printer the K, C, M, and Y inks 151 to 154 are usually output to overlap each other on the paper surface 150. In this instance the incident light 155 reaches the paper surface 150 through the ink layers 151 to 154. The incident light 155 is then reflected by the paper surface 150, is again transmitted through the ink layers 151 to 154, and reaches an observer as the reflected light 156. During the course of the transmission and reflection, energy absorptions sequentially occur in the ink layers 151 to 154 at different spectral absorbance. Consequently, the spectral composition of the light changes, and this reproduces a color.

Due to the difference between the color reproduction methods as described above, the color reproduction range of a monitor is different from that of a printer; normally, the color reproduction range of a monitor is wider.

Generally, printers which perform a color output action receive RGB signals, form CMYK signals by color processing such as color space compression, and reproduce a color by performing the subtractive process for the inks of the CMYK signals.

Some printers which perform processing such as the color space compression discussed above, particularly some inkjet printers have a function of changing the output scheme in order to meet the demands of a user, e.g., increasing the output speed or improving the output quality.

When the output scheme is changed in this way, the color reproduction range of an output image also changes accordingly. Therefore, it is desirable to selectively use color processing including color space compression in accordance with the change in the output scheme. Unfortunately, in conventional image processing apparatuses only one color space compression method is provided in an output unit. Consequently, it is not possible to selectively use color space compression methods according to the output scheme. This makes it impossible to perform an optimum color reproduction corresponding to the output scheme.

Likewise, the color reproduction range also changes in accordance with the type of recording medium on which an image is to be formed. However, no conventional methods can perform an optimum color reproduction corresponding to the recording medium.

SUMMARY OF THE INVENTION

It is an object of the present invention to provide a color image processing apparatus and a color image processing method capable of solving the above conventional problems.

It is another object of the present invention to perform an optimum color reproduction by using color space compression corresponding to an image output method.

It is still another object of the present invention to perform an optimum color reproduction by using color space compression corresponding to a recording medium.

It is still another object of the present invention to perform an optimum color reproduction by using color space compression corresponding to an image output method and to a recording medium.

An image processing apparatus according to one embodiment of the present invention comprises selecting means for selecting one of a plurality of image output methods, and color space compressing means for performing color space compression on the basis of the image output method selected by the selecting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the arrangement of an image processing apparatus according to the first embodiment of the present invention;

FIG. 3 is a flow chart showing one-page output processing in the first embodiment;

FIG. 4 is a view showing a print mode designation command in the first embodiment;

FIG. 5 is a flow chart showing the processing of an analyzing unit in the first embodiment;

FIG. 6 is a flow chart showing one example of the processing of a color processing method selecting unit in the first embodiment;

FIG. 12 is a view showing a recording medium designation command in the third embodiment;

FIG. 13 is a view showing one example of panel switches in the third embodiment;

FIG. 14 is a view showing the arrangement of a recording medium supply unit in an output unit of the third embodiment;

FIGS. 17A and 17B are views showing a color processing method in the fifth embodiment according to the present invention;

FIG. 26 is a view showing one example of a color gumut selection table in the sixth embodiment.

DETAILED DESCRIPTION OF THE PREFERRED EMBODIMENTS

Figure 2A:
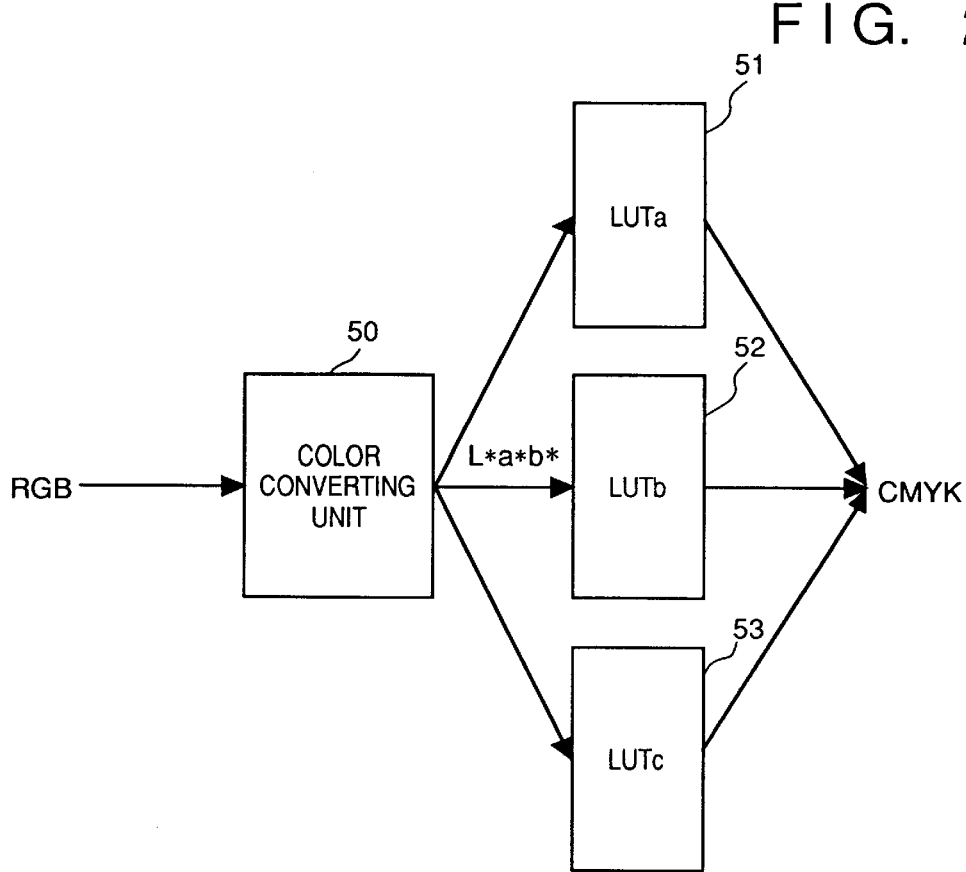
FIGS. 2A and 2B are views for explaining the processing of a color processing unit in the first embodiment.

The first embodiment of the present invention is described in detail below with reference to the accompanying drawings.

Note that each of the following embodiments is described by taking an ink-jet color printer as an example, but the present invention is, of course, similarly applicable to other output apparatuses such as a color printer of another type.

1st Embodiment

In this embodiment, an image processing apparatus comprises an input means, an analyzing means, a developing means, a color processing means, a storage means, a color processing method selecting means, an output means and an output method selecting means. The input means receives image data from an external apparatus, which includes data in the form of a command for controlling an output action. The analyzing means analyzes the input data from the input means. In accordance with the analytical result of the analyzing means, the developing means develops the input data into output data. The color processing means which constitutes part of the developing means performs color processing for the input data while the developing means is developing the data. The storage means stores a plurality of methods for the color processing. The color processing method selecting means selects one of the color processing methods stored in the storage means. The output means outputs the output data developed by the developing means. The output method selecting means selects one of a plurality of output methods of the output means. In the image processing apparatus with this arrangement, the analyzing means analyzes input data from an external apparatus, and in accordance with the analytical result the output method selecting means selects the output method of the output means. On the basis of the output method thus selected, the developing means develops the input data into output data, and the color processing method selecting means selects one of the color processing methods stored in the storage means. The color processing means performs color processing according to the color processing method selected.

In this embodiment, therefore, it is possible to selectively perform the color processing methods in accordance with the output method selected in the image processing apparatus. This makes optimum color reproduction feasible.

Details of the embodiment are described below.

FIG. 1 is a block diagram showing the arrangement of the image processing apparatus according to the first embodiment of the present invention. In FIG. 1, reference numeral 1 denotes the image processing apparatus; and 2, an external apparatus such as a host computer or a terminal device. In the image processing apparatus 1, an input unit 11 receives transferred data from the host computer 2. An analyzing unit 12 analyzes the input data from the input unit 11 and generates data of an intermediate format to be used by a developing unit 13 (to be described later). The analyzing unit 12 also commands an output method selecting unit 17 (to be described later) to select an output method. The developing unit 13 performs various processing in accordance with the intermediate-format data formed by the analyzing unit 12, converting the data into output data used by an output unit 18 (to be described later) in performing an output action. A color processing unit 14 is provided in the developing unit 13 to perform color processing. A color processing method selecting unit 15 selects a color processing method, by which the color processing unit 14 performs the color processing, from a color processing method storage unit 16 in accordance with the output method. The color processing method storage unit 16 stores a plurality of color processing methods which the color processing unit 14 uses in performing the color processing. The output method selecting unit 17 selects an output method, by which an output unit 18 outputs the data, in accordance with the command from the analyzing unit 12. The output unit 18 forms an output image by using the output data from the developing unit 13 in accordance with the output method selected by the output method selecting unit 17.

A CPU 19 generally controls the overall arrangement. A ROM 20 stores programs of the processing shown in the flow charts of FIGS. 3, 5 and 6 (to be described later). The ROM 20 is accessed by the CPU 19. A RAM 21 is used as a work area by the CPU 19.

The way the color processing unit 14 performs the color processing is described below with reference to FIG. 2A. In FIG. 2A, a color converting unit 50 converts input RGB values into L*a*b* values. LUTa 51, LUTb 52, and LUTc 53 are LUTs which convert the L*a*b* values into CMYK values.

Figure 2B:
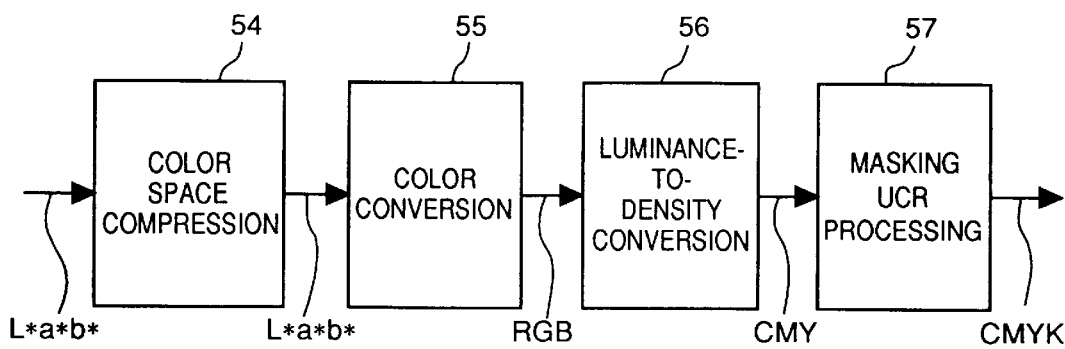

As illustrated in FIG. 2B, the conversion from L*a*b* values into CMYK values performed by the LUTs is based on the results obtained by color space compression 54 performed in the L*a*b* color space, color conversion 55 for converting L*a*b* values into RGB values, luminance-to-density conversion 56, and masking UCR processing 57. The LUTs 51 to 53 are stored in the color processing method storage unit 16 and capable of different types of color space compression. In this embodiment, each LUT can be read to be used in the color processing unit 14 as needed.

Figure 20A:
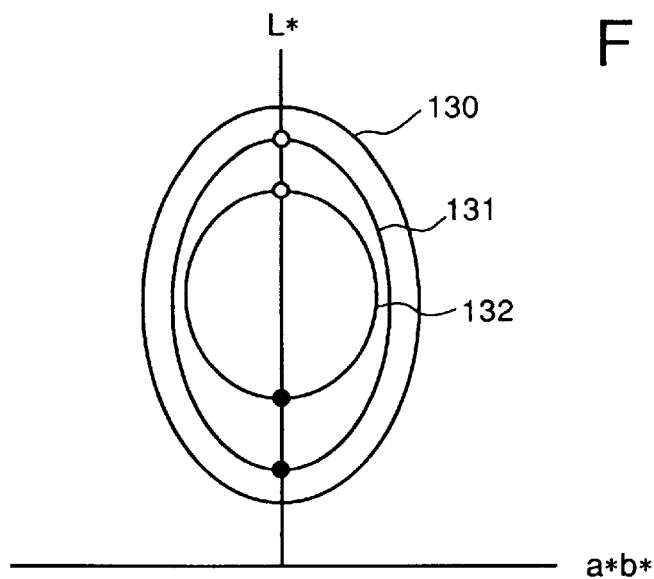
FIGS. 20A and 20B are views showing the concept of color space compression in the first embodiment of the present invention.

FIG. 20A shows that the color reproduction range of a monitor differs from that of a printer. In FIG. 20A, reference numeral 130 denotes a color reproduction range that is theoretically possible in a uniform color space in accordance with, e.g., the NTSC standards. That is, the color reproduction range 130 is one which can be taken by the input data from a host computer. Reference numeral 131 denotes the color reproduction range of a monitor; and 132, the color reproduction range of a printer. As in FIG. 20A, the color reproduction range 132 of a printer is the narrowest. Therefore, in outputting an input color image from an output apparatus, it is necessary to perform color space compression for colors present outside the color reproduction range of the output apparatus in order to make these colors correspond to some appropriate colors within the color reproduction range. Generally, a plurality of methods are possible as the method of color space compression. One example of the method is described below with reference to FIG. 20B.

Figure 20B:
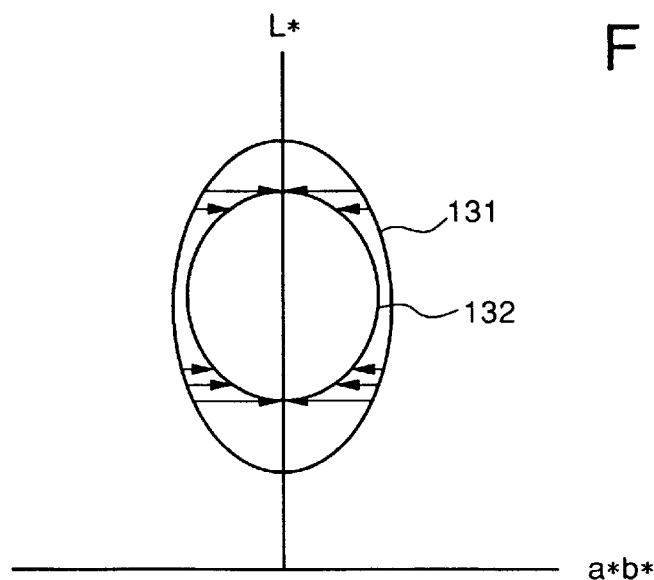
Figure 21:
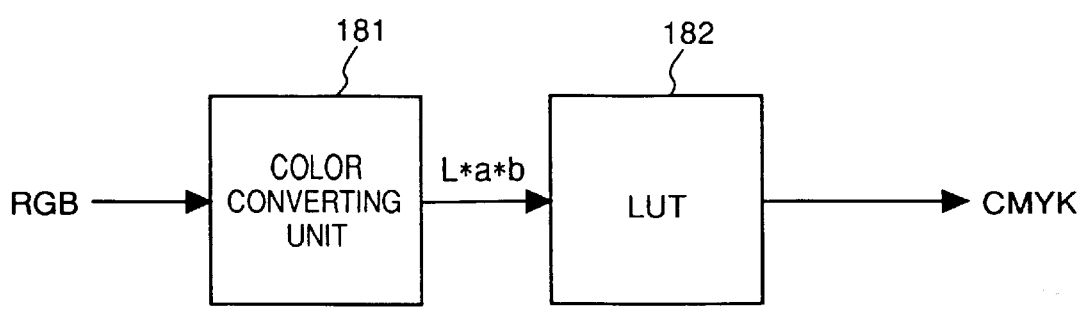
FIG. 21 is a view showing the concept of color processing in the first embodiment.

In FIG. 20B, reference numerals 131 and 132 denote the color reproduction ranges of a monitor and a printer, respectively, as in FIG. 20A. In the color space compression method shown in FIG. 20B, colors present outside the color reproduction range 132 of a printer and inside the color reproduction range 131 of a monitor are mapped to the peripheral edge of the color reproduction range 132 of a printer without changing L* (lightness) of each color. The common approach by which this color space compression is effected is to use a lookup table (to be referred to as LUT hereinafter). An arrangement for performing the color space compression by using LUT is illustrated in FIG. 21. In FIG. 21, RGB values as input signals are temporarily converted into L*a*b* values by a color converting unit 181. Subsequently, CMYK values are attained by referring to LUT 182 by using the L*a*b* values as input values. Usually, the LUT 182 is formed on the basis of the correspondence between the colorimetric value of output patch data and the input value of the original patch data. That is, if the colorimetric results of output patch data having values C1, M1, Y1, and K1 are L1*, a1*, and b1*, values of R1, G1 and B1 are obtained by inversely converting the L1*, a1* and b1*; in this manner the correspondence between them is obtained. The conversion to L*a*b* values is performed in the course of the processing because the colorimetric system is a uniform color space, and so the color distance in the system equals the physical distance in the table.

In this embodiment, the output unit 18 is an ink-jet printer. The output data from the output unit 18 is data of a bit map format of one page and is provided for each of the four colors, C, M, Y, and K. The output unit 18 sends the output data to a head, and the head forms images on output paper by using inks of C (cyan), M (magenta), Y (yellow), and K (black).

Figure 23A:
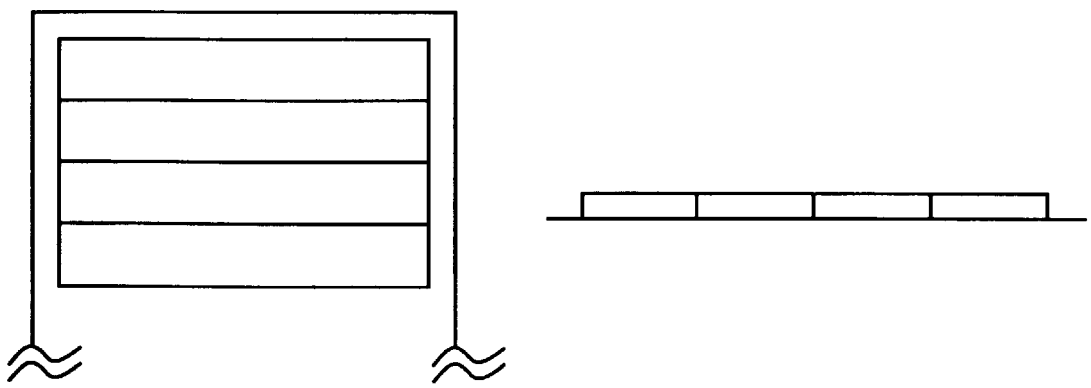
FIGS. 23A to 23C are views for explaining the differences between the output methods of the ink-jet printer in the first embodiment.
Figure 23B:
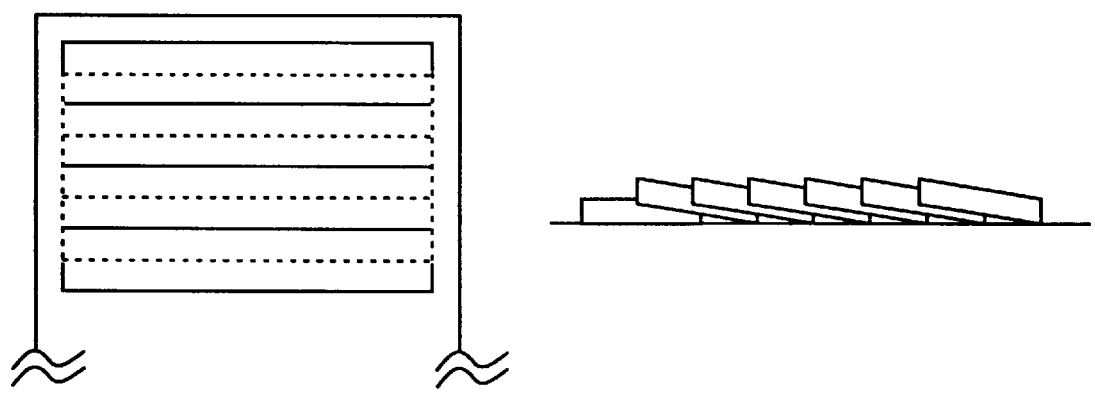
Figure 23C:
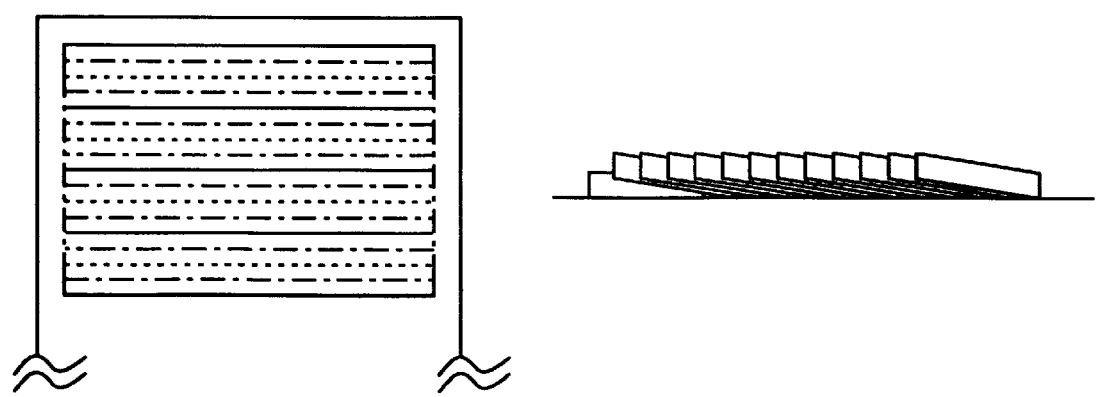

Since the output unit 18 of this embodiment is an ink-jet printer, the output methods of the output unit 18 include "NORMAL mode", FIG. 23B, in which a normal output operation is performed, "DRAFT mode", FIG. 23A, in which a high-speed output operation is performed, and "QUALITY mode", FIG. 23C, in which a high-quality output operation is performed. Recording media include, e.g., plain paper (to be referred to as "PLAIN" hereinafter), special-purpose paper (to be referred to as "COAT" hereinafter), and OHP sheet (to be referred to as "OHP" hereinafter).

Since in this embodiment the output unit 18 is an ink-jet printer, an ink-jet type printer is described below with reference to FIGS. 22A to 23C.

Figure 22A:
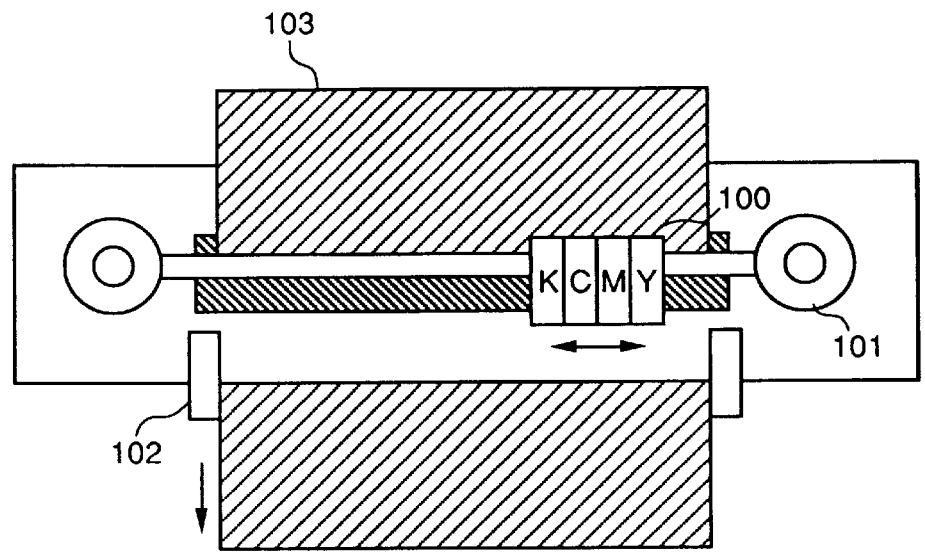
FIGS. 22A and 22B are views for explaining the structure of an ink-jet printer in the first embodiment.

FIG. 22A shows the way in which an ink-jet printer forms an image. In FIG. 22A, reference numeral 100 denotes a head for forming images by ejecting inks of C, M, Y, and K on output paper 103. A CR motor 101 moves the head 100 perpendicularly with respect to the insertion direction of the output paper 103. An LF motor 102 feeds the output paper in the insertion direction. The CR motor 101 and the LF motor 102 together move the head 100 to form images on the output paper 103.

Figure 22B:
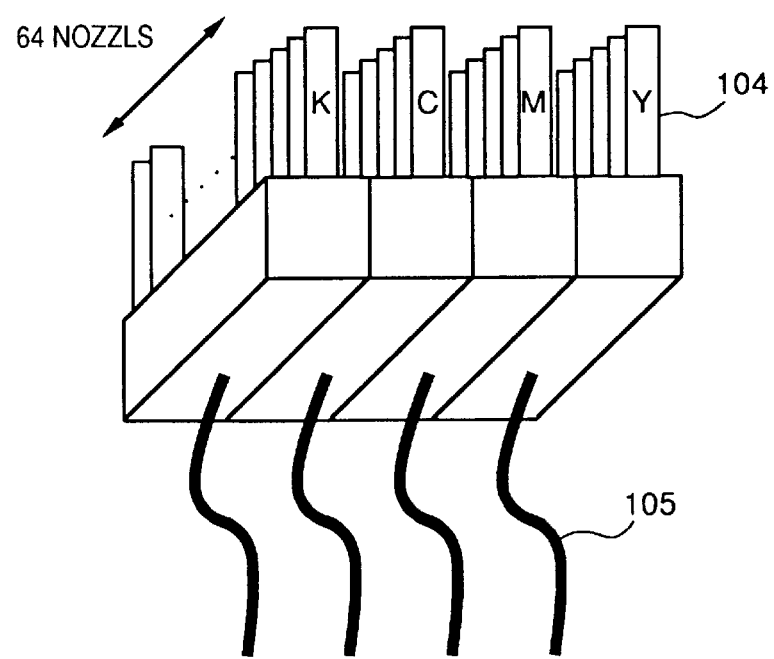

Details of the head 100 are described below with reference to FIG. 22B. As shown in FIG. 22B, the head 100 is constituted by combining a plurality of nozzles 104 as minimum ink ejecting units. That is, 64 nozzles are aligned in the longitudinal direction in each of C, M, Y, and K nozzle arrays juxtaposed in the lateral direction. The C, M, Y, and K nozzle arrays are connected to tubes 105 for supplying their respective inks.

With the above arrangement, the head 100 forms an image having 64 dots in the longitudinal direction as it is moved (passed) once by the CR motor 101.

The differences between the output methods of the ink-jet printer with the arrangement in FIGS. 22A and 22B are described below with reference to FIGS. 23A to 23C. In each of FIGS. 23A to 23C, the top view of the output paper 103 is depicted on the left-hand side, and the side view of the output paper 103 is depicted on the right-hand side. Both of the top and the side views illustrate the relationship between the 64 dots formed by one pass of the head 100 and the output paper 103.

FIG. 23A shows a one-pass output method, i.e., the "DRAFT mode". In FIG. 23A, after the head 100 outputs 64 dots, the LF motor 102 feeds the output paper 103 by 64 dots. Consequently, there is no overlapping of the ink layers between the individual successive passes. FIG. 23B shows a two-pass output method, e.g., the "NORMAL mode". In FIG. 23B, after the head 100 outputs 64 dots, the LF motor feeds the output paper 103 by 32 dots. Consequently, two ink layers overlap each other between the individual successive passes. That is, according to the two-pass output method an output image is formed by two passes of the head 100. FIG. 23C illustrates a four-pass output method, i.e., the "QUALITY mode". In FIG. 23C, after the head 100 outputs 64 dots, the LF motor 102 feeds the output paper 103 by 16 dots. As a consequence, four ink layers overlap each other between the individual successive passes. That is, according to the four-pass output method an output image is formed by four passes of the head 100.

The output methods have their respective features as discussed above. Therefore, the one-pass output method has the advantage of reducing the output time. The four-pass output method has the advantage that the output quality is improved by overlapping of the four ink layers. Consequently, it is possible to provide an output method meeting the intended use of an operator.

The differences in the overlapping of the ink layers between the output methods shown in FIGS. 23A to 23C appear as colorimetric differences between the colors of an output image. This is described with reference to FIGS. 24A to 24C.

Figure 19:
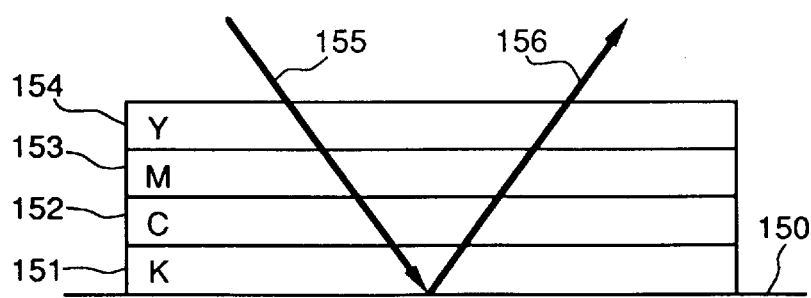
FIG. 19 is a view for explaining a subtractive process in the conventional image processing apparatus.
Figure 24A:
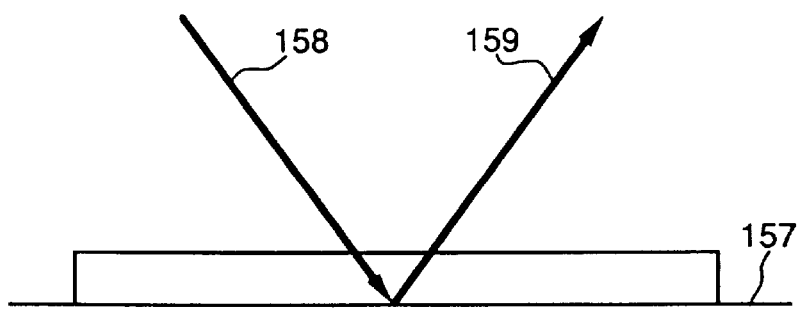
FIGS. 24A to 24C are views for explaining the relationships between the output method of the ink-jet printer and the overlapping of ink layers in the first embodiment.
Figure 24B:
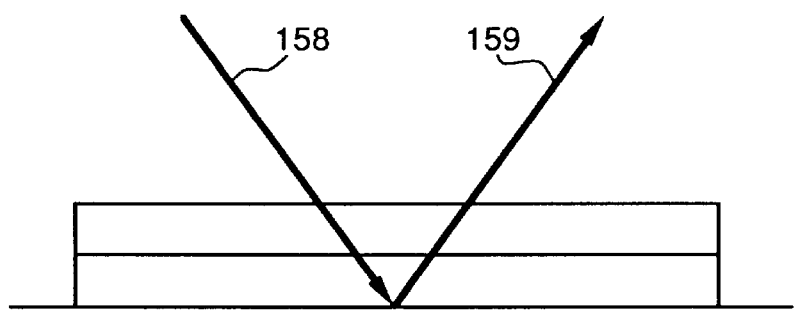
Figure 24C:
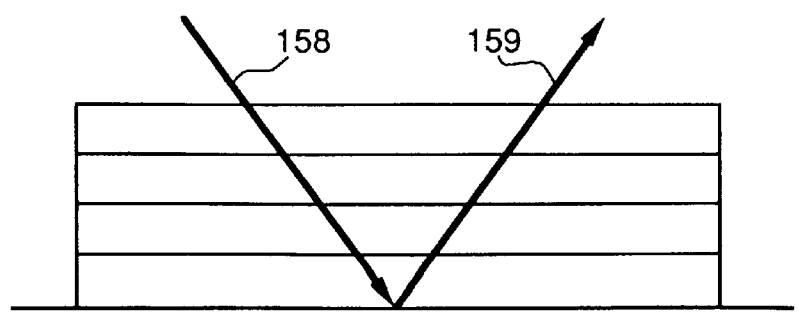

FIGS. 24A, 24B, and 24C show incident light 158 and reflected light 159 with respect to images formed on output paper 157 by the one-pass, two-pass, and four-pass output methods, respectively. In actual printing, color reproduction is performed by using four inks of C, M, Y, and K. For the sake of simplicity, however, color reproduction using only one ink is described below. In the subtractive process, as depicted in FIG. 19, incident light reaches the paper surface through ink layers. The incident light is then reflected by the paper surface to again pass through the ink layers and reaches an observer as reflected light. In the course of this process, energy absorptions sequentially take place in the individual ink layers having different spectral absorbances. Consequently, the spectral composition of the light changes, and this reproduces a corresponding color. In this case it is obvious from FIGS. 24A to 24C that the light absorbance changes if the thickness of an ink layer through which the incident light 158 and the reflected light 159 pass changes. Therefore, output images formed by different output methods have different spectral compositions of the reflected light 159.

In addition, since reproduced colors are different, the color reproduction ranges of the output methods are also different.

Figure 25:
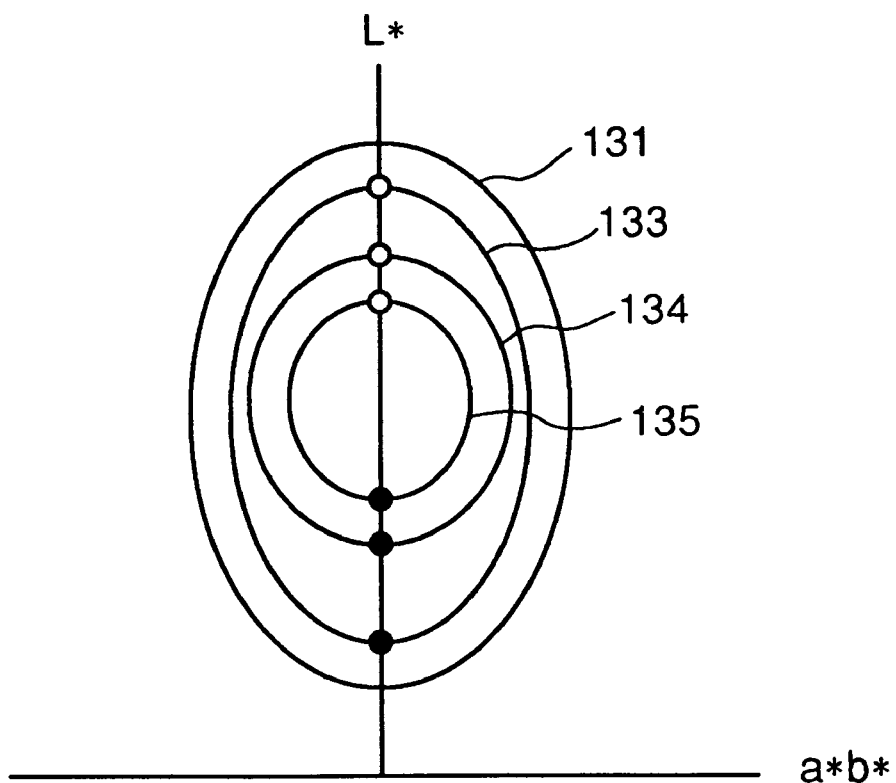
FIG. 25 is a view for explaining the relationships between the output method of the ink-jet printer and the color reproduction range in the first embodiment.

FIG. 25 shows the color reproduction ranges, expressed in the L*a*b* space, of the reflected light 159 in FIGS. 24A to 24C. In FIG. 25, reference numerals 135, 134, and 133 denote the color reproduction ranges obtained by the one-pass, two-pass, and four-pass output methods, respectively. As in FIG. 25, the color reproduction range widens with increasing thickness of the ink layers. Note that reference numeral 131 denotes the color reproduction range of a monitor mentioned previously.

As illustrated in FIGS. 2A and 2B, this embodiment makes use of LUTs which perform color space compression on the basis of the color reproduction range corresponding to the output method selected. Consequently, it is possible to obtain high-quality output images regardless of the type of the output method selected.

The procedures of the color processing in this embodiment is described below with reference to the flow charts shown in FIGS. 3, 5 and 6.

FIG. 3 is a flow chart showing the procedure in which the image processing apparatus 1 receives data of one page from the host computer 2 and forms output data. Referring to FIG. 3, in step S20 the input unit 11 receives data of one page from the host computer 2. This input data contains data for designating the contents of an output image and data for designating the output conditions of the output image. The former data includes a command for designating the type of character code or character font, or a command for full-color image data and a command for designating a portion or a color of that data. The latter data includes a command for designating an output method or a recording medium used in an output action.

FIG. 4 shows the command for designating the output conditions. In FIG. 4, the first one byte is a "print mode designation command" for indicating the type of command, which represents that this command is for designating an output method. A plurality of bytes succeeding the first one byte indicate a "print mode" for designating the type of output method used in processing the corresponding command string. In the image processing apparatus of this embodiment, three different output methods are designated; that is the "NORMAL mode" is designated when the "print mode" is "00", the "DRAFT mode" is designated when the "print mode" is "01", and the "QUALITY mode" is designated when the "print mode" is "02".

As with the command shown in FIG. 4, in other commands used in this embodiment the first one byte indicates the command type and is succeeded by parameters.

Subsequently, in step S21 of FIG. 3 the analyzing unit 12 analyzes the input data and performs processing according to the type of command thus analyzed. That is, if the analyzed command is the one for designating the contents of an output image, the analyzing unit 12 forms data of an intermediate format in units of pages in accordance with the analytical result. The intermediate-format data is data on the basis of which the developing unit 13 forms output data of a bit map format. However, this data format is not described here.

The flow chart in FIG. 5 illustrates the processing performed when the command analyzed in step S21 is the command for designating an output method. Referring to FIG. 5, in step S30 the type of the designated "print mode" is read in. As discussed above, three different print modes are available. Subsequently, whether the print mode information obtained in step S30 is "DRAFT" is checked in step S31. If the print mode information is "DRAFT", in step S35 "DRAFT" is set as the current output method in a predetermined area of the RAM 21. If the print mode information is not "DRAFT" in step S31, whether the information is "QUALITY" is checked in step S32. If the information is "QUALITY", "QUALITY" is set as the current output method in step S34. If the information is not "QUALITY" in step S32, "NORMAL" is set as the current output method in step S33. In step S36, the analyzing unit 12 commands the output method selecting unit 17 to select an output method. Upon receiving the designation, the output method selecting unit 17 sets the output method that has been set as the current output method.

Figure 18:
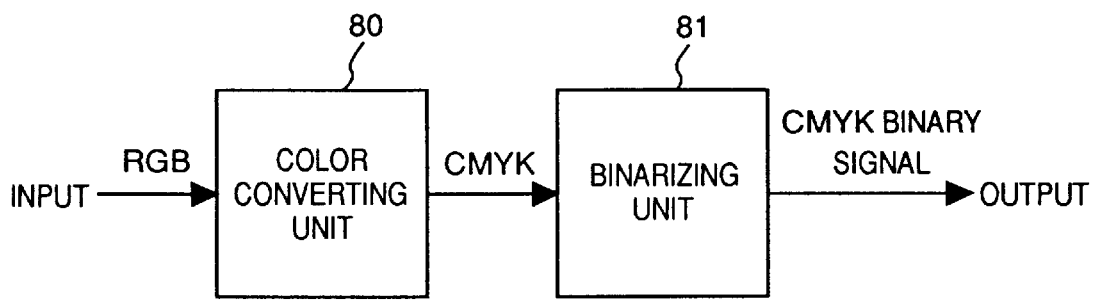
FIG. 18 is a view showing the concept of color processing in a conventional image processing apparatus.

Subsequently, in step S22 of FIG. 3 whether the analyzing unit 12 has completed the analysis of one page is determined. This determination is usually performed by checking whether a page end command "FF" is received. If the analysis of one page of the input data is not completed, the flow returns to step S20. If it is determined in step S22 that one page of the input data is completely analyzed, the flow advances to step S23 to perform development and color processing. The development and the color processing are performed by the developing unit 13 and the color processing unit 14, respectively, on the basis of the intermediate-format data described above. That is, the developing unit 13 develops the intermediate-format data into bit-map data by processing the intermediate-format data in the order of storage, thereby forming the bit-map data in a bit-map memory of one page. The color processing unit 14 performs the color processing in accordance with the current color processing method selected by the color processing method selecting unit 15. In this case the color processing method selecting unit 15 selects a color processing method corresponding to the current output method from the color processing method storage unit 16 and sets the selected color processing method as the current color processing method. The color processing herein mentioned is-color conversion from input RGB signals into CMYK signals performed by the color converting unit 80, FIG. 18. This color processing is perform by the color converting unit 50, the LUTa 51, the LUTb 52, and the LUTc 53 shown in FIG. 2A. That is, in this color processing the color space compression is performed in accordance with the color processing method selected.

The flow chart in FIG. 6 shows the color processing in step S23 of FIG. 3. Referring to FIG. 6, in step S40 whether the current output method is "DRAFT" is checked. If the current output method is "DRAFT", in step S41 the current color processing method (to be referred to as CCPM hereinafter) is set to "CMP1". If the current output method is not "DRAFT" in step S40, whether the current output method is "NORMAL" is checked in step S42. If the current output method is "NORMAL", the CCPM is set to "CPM2" in step S43. If the current output method is not "NORMAL" in step S42, the method is "QUALITY". Therefore, the CCPM is set to "CPM3" in step S44. The "CPM1", "CPM2", and "CPM3" respectively correspond to the LUTa 51, the LUTb 52, and the LUTc 53, FIG. 2A, prepared for the individual output methods, and are stored in the color processing method storage unit 16.

Figure 7A:
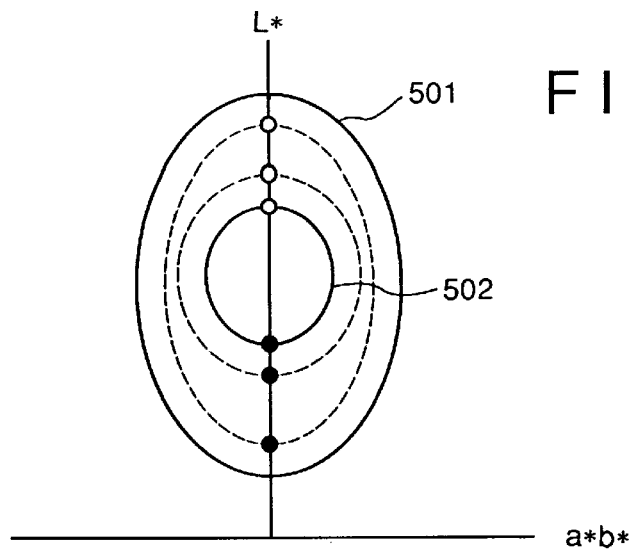
FIGS. 7A to 7C are views showing the concept of color space compression in the first embodiment.

FIG. 7A shows an example of the color space compression performed by "CPM1". In FIG. 7A, reference numeral 501 denotes the color reproduction range of an input image which, in this embodiment, equals the color reproduction range of a source device such as a monitor; and 502, the color reproduction range of CMYK signals which can be output from the LUTa 51, FIG. 2A. Reproduction ranges indicated by the dotted lines in FIG. 7A are those which can be output from the LUTb 52 and the LUTc 53 (to be described later).

Referring to FIG. 7A, "CPM1" is prepared as the color space compression for "DRAFT", in which the color reproduction range of the output apparatus is the narrowest of the three output methods discussed above. In "CPM1", the color space compression is performed from the color reproduction range 501 to 502.

Figure 7B:
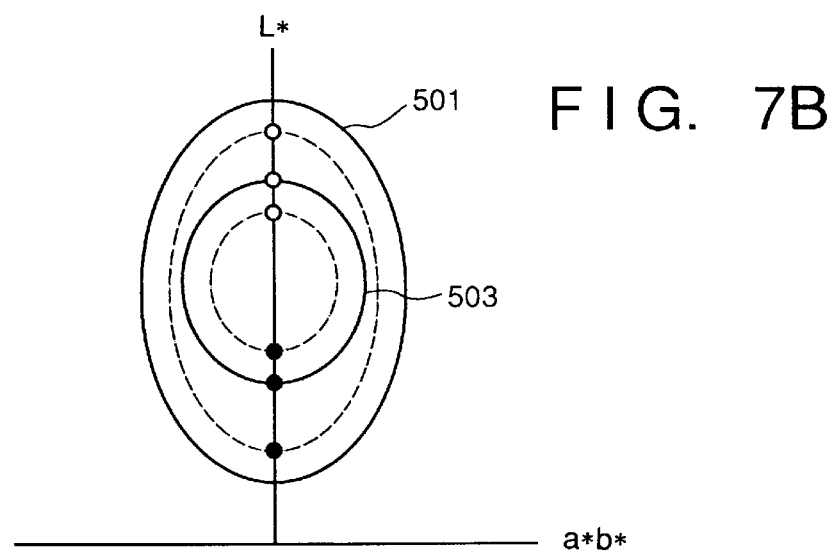
Figure 7C:
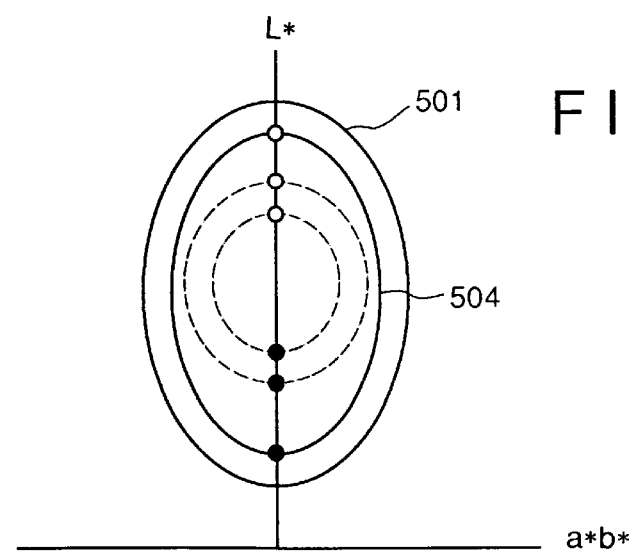

Likewise, FIGS. 7B and 7C show examples of the color space compression for "NORMAL" and "QUALITY", respectively. In FIGS. 7B and 7C, reference numerals 503 and 504 denote the color reproduction ranges that can be output from the LUTb 52 and LUTc 53, FIG. 2A, respectively. As discussed earlier, an entry constituting each LUT is formed on the basis of the correspondence between the colorimetric value of output patch data in the current output method and the input value of the original patch data.

As discussed above, the color processing method selecting unit 15 sets an optimum CCPM for the current output method. The color processing unit 14 performs the color conversion in the color converting unit 80, FIG. 18, by using the set CCPM. On the basis of the output value obtained by the color processing unit 14 according to the selected color processing method, the developing unit 13 forms four types of data C, M, Y, and K in the bit-map memory. That is, the color processing unit 14 is a "black box" in the developing unit 13; the color processing unit 14 outputs an optimum value in accordance with the input value and with the designated color processing method.

When the formation of the bit-map data C, M, Y, and K is completed in step S23 in FIG. 3, the formed data is output in step S24. This output action is accomplished by the following procedure. That is, the bit-map data formed in step S23 is converted into a suitable form by which the head of the output unit 18 outputs an image. The suitable form herein mentioned depends on the shape of the head. As an example, for the head 100 illustrated in FIGS. 22A and 22B, the four bit-map data C, M, Y, and K are divided into blocks in units of 64 rasters. After the data conversion, the output unit 18 feeds the recording medium 103 and transmits the data blocks C, M, Y, and K in sequence to the head 100. At the same time, the output unit 18 causes the CR motor 101 to move the head 100 as shown in FIG. 22A, thereby outputting 64 dots. Thereafter, the output unit 18 operates the LF motor in accordance with the current output method, performing the output action by one of the one-pass ("DRAFT"), two-pass ("NORMAL") and four-pass ("QUALITY") methods. The output unit 18 repeats a series of these operations (i.e., data block transfer, output and paper feed) until the end of one page and delivers the paper, completing the output of one page.

According to this embodiment as discussed above, the color space compression methods are selectively performed in accordance with the output method designated by the input command. This makes optimum color reproduction feasible. In addition, since the color space compression is performed in the image processing apparatus, no extra load is imposed on an external apparatus such as a host computer.

2nd Embodiment

The second embodiment according to the present invention is described in detail below.

In the first embodiment discussed above, switching between the color space compression methods to be used in the color processing unit 14 is performed in accordance with the output method which is designated by the input command from the host computer. This second embodiment, however, is arranged such that the color space compression methods used in the color processing unit 14 are switched according to the output method designated when an operator depresses a panel switch. That is, in the first embodiment, as indicated in step S36 of FIG. 5, the analyzing unit 12 analyzes the input command and, in accordance with the analytical result, commands the output method selecting unit 17 to switch the output methods. Upon receiving this command, the output method selecting unit 17 switches the output methods. On the other hand, in the second embodiment an operator can switch the output methods by depressing a panel switch provided on the output method selecting unit 17.

The basic arrangement, therefore, of an image processing apparatus of the second embodiment is analogous to that of the first embodiment. The second embodiment differs from the first embodiment in that the output method selecting unit 17 includes a means, such as the panel switch mentioned above, which is provided in the image processing apparatus, and by which the output method can be selected. The second embodiment is also different in the control method for the purpose.

Figure 8:
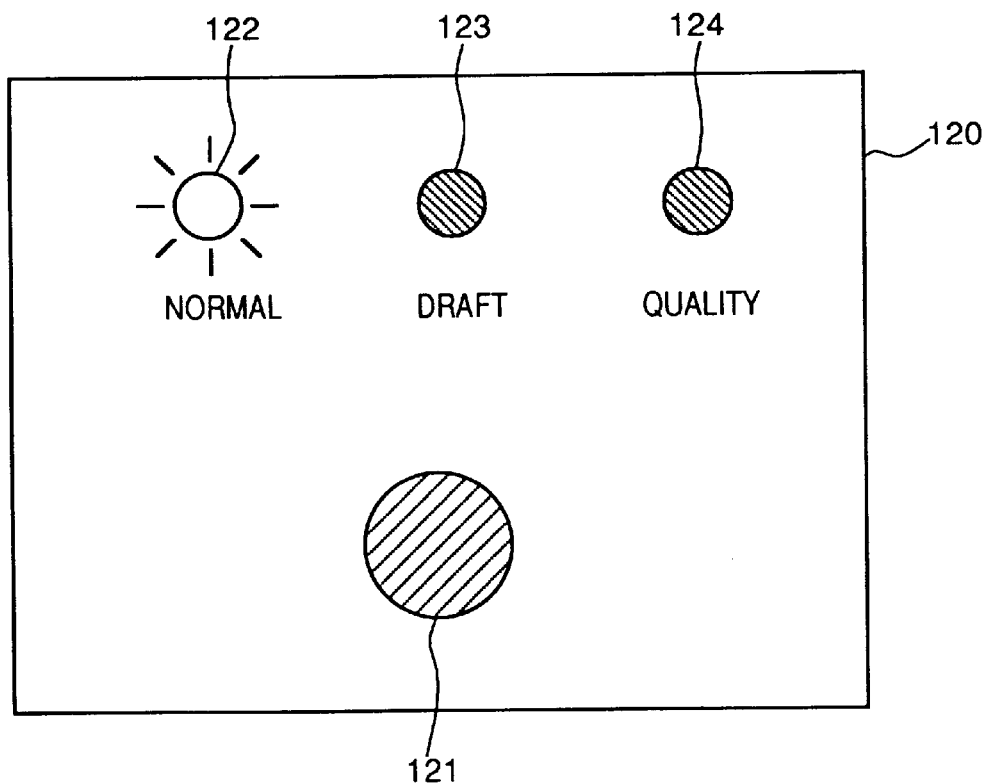
FIG. 8 is a view showing one example of a panel switch in the second embodiment according to the present invention.

FIG. 8 shows the outer appearance of a panel used in the second embodiment. In FIG. 8, reference numeral 120 denotes a panel main body; and 121, a panel switch. An operator switches the output methods by depressing the panel switch 121. Which of "NORMAL", "DRAFT", or "QUALITY" is set as the currently selected output method is indicated by lighting a corresponding one of LEDs 122 to 124. Note that in this embodiment, at start-up of the apparatus the LED 122 is lit to indicate that "NORMAL" is set as the output method.

The difference of the second embodiment from the first embodiment is described below.

Figure 9:
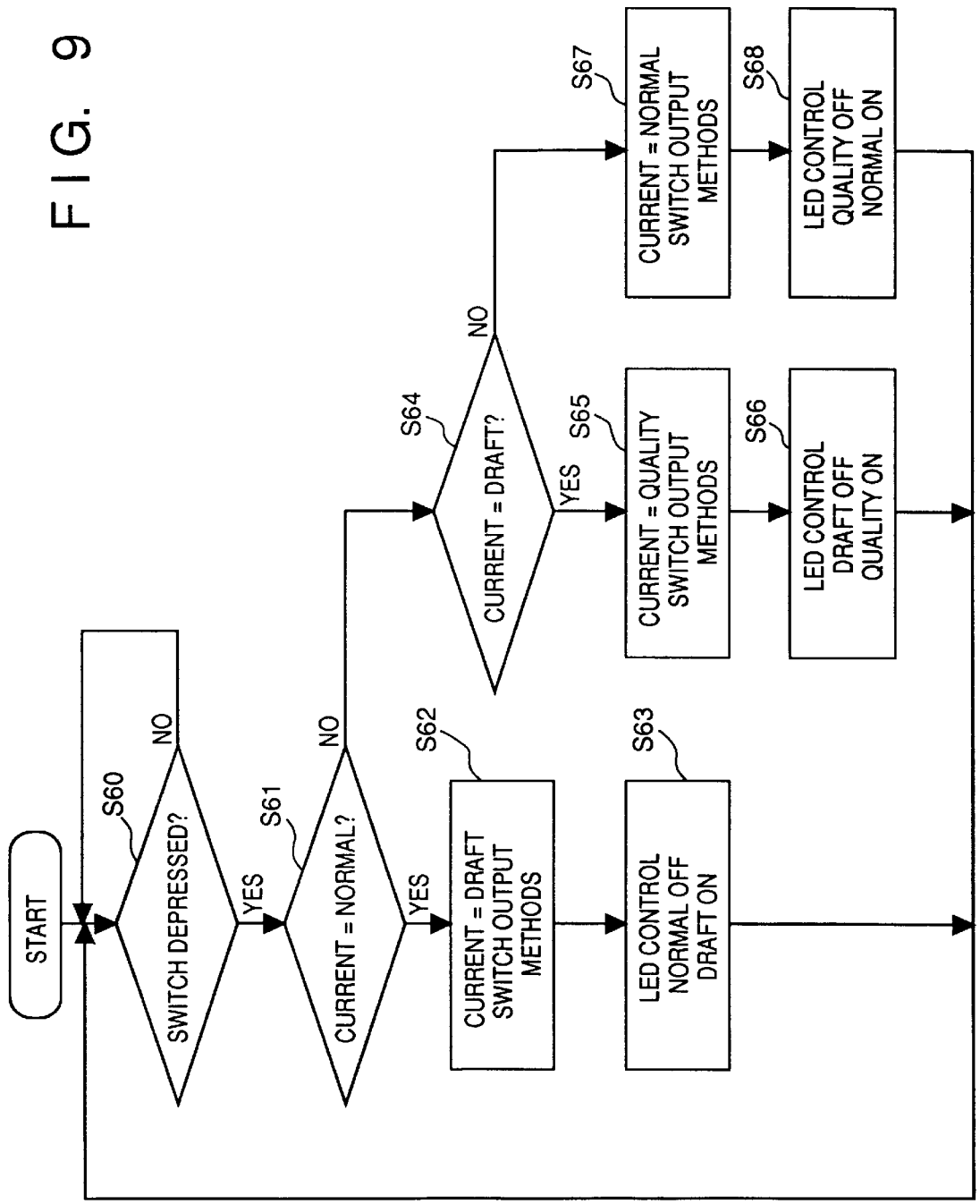
FIG. 9 is a flow chart showing the processing of an output method selecting unit in the second embodiment.

The flow chart in FIG. 9 shows the processing performed by the output method selecting unit 17 of the second embodiment. Referring to FIG. 9, in step S60 whether the panel switch 121 for switching the output methods is depressed is checked. If the panel switch 121 is not depressed, the flow returns to step S60. If it is determined in step S60 that the panel switch 121 is depressed, the flow advances to step S61 to check whether the current output method is "NORMAL". If the current output method is "NORMAL", the flow advances to step S62 to change the current output method to "DRAFT", thereby switching the output methods. Thereafter, control of the LEDs 122 to 124 is performed in step S63. That is, in step S63 the LED 122 indicative of "NORMAL" is turned off and the LED 123 indicative of "DRAFT" is turned on. The flow then returns to step S60 to prepare for the next depression of the panel switch 121.

If, on the other hand, the current output method is not "NORMAL" in step S61, the flow advances to step S64 to check whether the current output method is "DRAFT". If the current output method is "DRAFT", processing for switching the current output method to "QUALITY" is performed in steps S65 and S66 in the same manner as above. If the current output method is not "DRAFT" in step S64, processing for switching the current output method to "NORMAL" is performed in steps S67 and S68. Thereafter, the flow returns to step S60 to prepare for the next depression of the panel switch 121.

In the second embodiment, the operation excluding the above-mentioned output method selecting processing performed by the output method selecting unit 17 is identical with that of the first embodiment, so a detailed description thereof is omitted.

According to the second embodiment as discussed above, it is possible to selectively use the color space compression methods in accordance with the output method designated by depression of the panel switch provided in the image processing apparatus. This allows an optimum color reproduction meeting the intended use.

Note that the second embodiment is practiced either independently of or simultaneously with the first embodiment.

3rd Embodiment

The third embodiment according to the present invention is described in detail below.

In the first embodiment discussed previously, switching between the color space compression methods to be used in the color processing unit 14 is performed in accordance with the output method designated by the input command from the host computer. However, the third embodiment is so arranged that switching between the color space compression methods to be used in the color processing unit 14 is performed in accordance with the combination of the output method designated by the input command from a host computer and the recording medium. That is, in the first embodiment, as illustrated in FIG. 6, the color processing method selecting unit 15 determines the CCPM in accordance with the current output method. In the third embodiment, however, the CCPM is determined not by the output method alone but by the combination of the output method and the output recording medium.

Figures 10, 11:
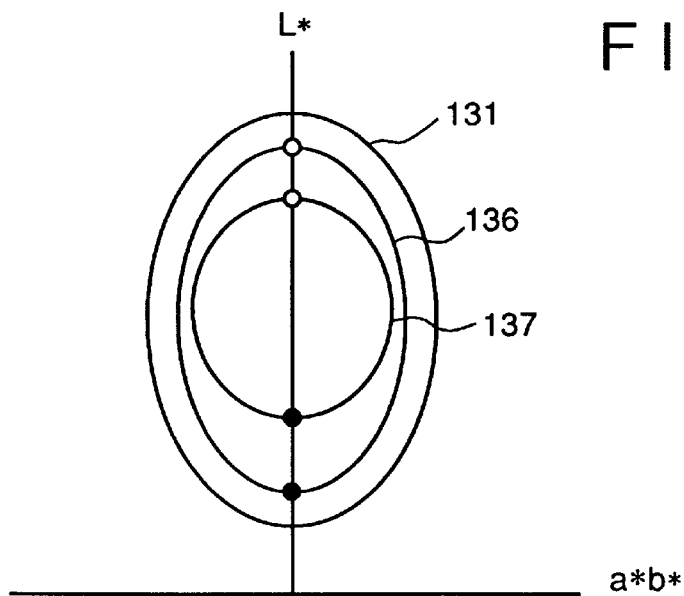
FIG. 10 is a view for explaining the relationships between the recording medium and the color reproduction range in the third embodiment of the present invention.
FIG. 11 is a view showing one example of a color processing method selection table in the third embodiment.

FIG. 10 shows the color reproduction ranges in the L*a*b* space when an output action is performed for different recording media by using the same output method. In FIG. 10, reference numeral 131 denotes the color reproduction range of a monitor, FIG. 20A, mentioned earlier; and 136 and 137, the color reproduction ranges when the output action is performed for "COAT" and "PLAIN" recording media, respectively. As in FIG. 10, the expressible color reproduction range varies in accordance with the type of output recording medium. FIG. 10 shows only the color reproduction ranges of "COAT" and "PLAIN" which express colors by using reflected light. "OHP", on the other hand, expresses colors by using transmitted light, and so the color reproduction range of "OHP" is generally broader.

As discussed above, the basic arrangement of the image processing apparatus of the third embodiment is identical with that of the first embodiment. The third embodiment is different from the first embodiment in that the apparatus includes a means for externally selecting a recording medium. The third embodiment is also different in the control method for this purpose.

The difference of the third embodiment from the first embodiment is described below.

A color processing method selecting unit 15 of the third embodiment determines the current color processing method, CCPM, in accordance with a table indicating different combinations of output methods and recording media. This combination table is stored in a ROM 20. An example of the combination table is illustrated in FIG. 11. The combination table in FIG. 11 indicates that if, for example, the print mode is "DRAFT" and the recording medium is "PLAIN", "CPM1" is chosen as the CCPM. Note that it is also possible to store the table in a RAM 21 so that the table can be updated when necessary.

In the third embodiment, a plurality of methods are possible as the method of designating the output recording medium. Examples of the method are as follows.

The first method of designating the output recording medium is to designate the medium by using a command string applied from an external apparatus via an input unit 11. An analyzing unit 12 stores the recording medium designated by the parameters of that command as the output recording medium. FIG. 12 shows an example of the "recording medium designation command" in the third embodiment. The first one byte indicates the type of command and is succeeded by "media mode". In this embodiment, three types of recording media "PLAIN", "COAT", and "OHP" are designated when the "media mode" is "00", "01" and "02", respectively.

The second method is analogous to the second embodiment; that is, a panel 120 as shown in FIG. 13 is provided in an output method selecting unit 17.

In FIG. 13, reference numeral 120 denotes a panel main body, and 121 to 124 in the panel 120 denote the same parts as in the panel 120 shown in FIG. 8. Reference numeral 125 denotes a panel switch for selecting a recording medium. An operator switches output recording media by depressing the panel switch 125. Whether the currently selected recording medium is "PLAIN", "COAT" or "OHP" is indicated by lighting a corresponding one of LEDs 126 to 128. The output method selecting unit 17 stores the recording medium designated by the depression of the panel switch 125 as the current recording medium.

The third method is to cause an output unit 18 to automatically detect the type of recording medium currently being used. An example of the method is illustrated in FIG. 14.

Referring to FIG. 14, a recording medium supply unit 141 of the output unit 18 includes switches 142 and 143. Reference numerals 145 to 147 denote cassettes storing recording media "PLAIN", "COAT" and "OHP", respectively. Projections 144 different in arrangement are formed at the front ends of the cassettes 145 to 147. With these projections 144, the types of these recording media can be distinguished by depressing the switch 142 or 143.

The output unit 18 stores the recording medium detected by the above method as the current recording medium. On the basis of the designated recording medium and the current output method, the color processing method selecting unit 15 selects a corresponding CCPM by referring to the table, FIG. 11. In this embodiment, nine types of CCPMs are already prepared in the table and stored in a color processing method storage unit 16. On the basis of the three types of CCPMs used in the first embodiment, processing times and qualities suitable for the intended use are prepared as the processing contents of each CCPM.

The operation of the third embodiment except for the processing discussed above is the same as that of the first embodiment, so a detailed description thereof is omitted.

According to the third embodiment as discussed above, it is possible to selectively use the color space compression methods in accordance with the combination of the output method and the output recording medium designated in the image processing apparatus. This makes an optimum color reproduction for the intended application possible.

Note that the third embodiment can be practiced either independently of or simultaneously with the first and second embodiments.

Note also that the color space compression methods can also be selectively performed in accordance only with the choice of the recording medium without designating the output method.

4th Embodiment

The fourth embodiment according to the present invention is described in detail below.

In the first embodiment discussed previously, switching between the color space compression methods to be used in the color processing unit 14 is performed in accordance with the output method designated by the input command from the host computer. However, the fourth embodiment is so arranged that switching between the color space compression methods to be used in the color processing unit 14 is performed in accordance with the forward and backward motions of a head when bidirectional printing is performed in an image processing apparatus.

The bidirectional printing performed in the image processing apparatus of the fourth embodiment is described below.

The head 100 described earlier with reference to FIG. 22A ejects ink as it moves perpendicularly with respect to the insertion direction of the recording medium 103 by the CR motor 101, thereby forming an image having 64 dots in the longitudinal direction in one pass. The left-to-right movement of the head 100 in this case is called a forward pass, and its right-to-left movement is called a backward pass. An output method which forms images by using these two passes is called bidirectional printing.

Figure 15A:
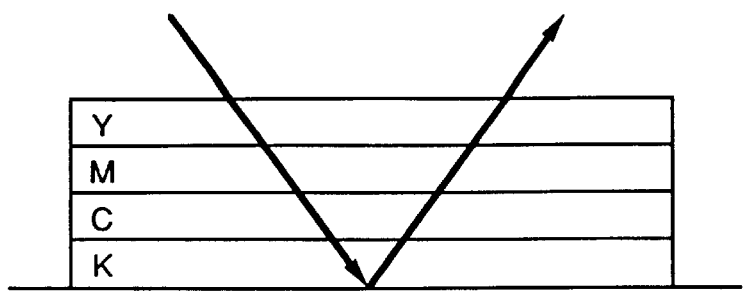
FIGS. 15A and 15B are views showing the overlapping of ink layers when bidirectional printing is performed in the fourth embodiment according to the present invention.
Figure 15B:
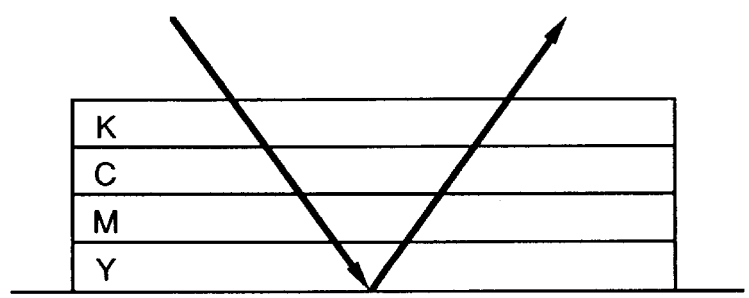

Bidirectional printing is used when printing is to be performed at a high speed. In bidirectional printing, the ejecting order of inks to a recording medium in the forward pass is different from that in the backward pass. This is illustrated in FIGS. 15A and 15B. FIG. 15A shows the overlapping of ink layers on a recording medium in the forward pass, and FIG. 15B shows them for the backward pass.

That is, in the forward pass the inks are ejected onto a recording medium in the order of K, C, M, and Y in accordance with the arrangement of these inks on the head 100. In the backward pass, the inks are ejected on the recording medium in the reverse order to the order in the forward pass; the ink layers overlap each other in the order of Y, M, C, and K. From the point of view of chromaticism, in the subtractive process it is ideal that the same color be reproduced by the same quantity of inks regardless of the order of overlapping of these inks. Actually, however any difference in the overlapping of inks appears as a difference in the color of an output image due to impurities in the inks or to differences in the ejection characteristics of the head 100. That is, the expressible color reproduction range in the forward pass of the head 100 differs from that in the backward pass.

In the fourth embodiment, switching between the color space compression methods used in the color processing unit 14 is performed in accordance with the forward and backward motion of the head in the bidirectional printing as discussed above. This realizes an ideal color reproduction.

The basic arrangement, therefore, of the fourth embodiment is identical with that of the first embodiment except for the operation and control of the output head.

The difference of the fourth embodiment from the first embodiment is described below.

Figure 16:
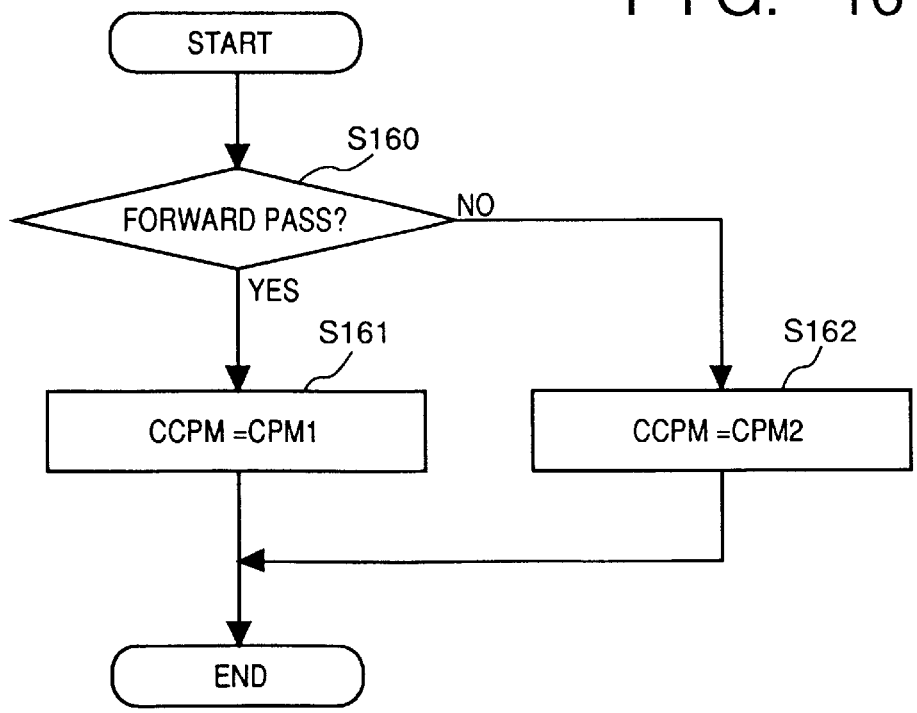
FIG. 16 is a flow chart showing one example of the processing of a color processing method selecting unit in the fourth embodiment.

The flow chart of FIG. 16 shows the processing of an output method selecting unit 17 of the fourth embodiment.

Referring to FIG. 16, in step S160 whether the output head is in the forward pass is checked. If the output head is in the forward pass, the flow advances to step S161, and the current color space compression method is set to "CPM1" which is a color space compression method for forward-pass processing. If the output head is not in the forward pass in step S161, the flow advances to step S162, and the current color space compression method is set to "CMP2" which is a color space compression method for backward-pass processing. The color processing unit 14 performs color processing in accordance with one of these color space compression methods.

The operation of the fourth embodiment excluding the output method selecting processing of the output method selecting unit 17 is the same as that of the first embodiment, so a detailed description thereof is omitted.

According to the fourth embodiment as discussed above, the color space compression methods are selectively used in accordance with the forward pass and the backward pass of the output head in the bidirectional printing. This permits an optimum color reproduction. Note that this embodiment can be performed either independently of or simultaneously with the first to third embodiments.

5th Embodiment

The fifth embodiment according to the present invention is described in detail below.

In the previous first embodiment, different types of color space compression are performed by the arrangement including the three different LUTs, FIGS. 2A and 2B. The arrangement of the fifth embodiment, however, does not necessarily use three different LUTs.

The basic arrangement of the fifth embodiment is identical with that of the first embodiment, so three types of CPMs, "CPM1" to "CPM3", are stored in a color processing method storage unit 16. However, these CPMs are not necessarily LUTs.

Methods of forming "CPM1" to "CPM3" in the fifth embodiment is described below with reference to FIGS. 17A, 17B, and 21.

First, "CPM1" in the fifth embodiment is described with reference to FIG. 17A. As in the first embodiment, "CPM1" is the processing which is prepared as a color processing method for "DRAFT" and in which the processing speed as its objective is given priority. That is, the logarithm of R, G and B values as input values are calculated as C', M' and Y', respectively. The minimum value of C', M' and Y' is used as K. The value of K is then subtracted from C', M' and Y' to obtain C, M and Y values, respectively, thereby ending the processing. This processing is performed at a high speed since the processing is the most basic processing of color conversion and the calculations are also simple.

A method of forming "CPM2" in the fifth embodiment is described next with reference to FIG. 17B. "CPM2" is the processing so-called masking which is prepared as a color processing method for "NORMAL" and is suitable for use in normal operations. That is, input RGB signals are converted into CMY signals by the matrix calculation illustrated in FIG. 17B. As in FIG. 17B, the masking parameter used in this calculation is a matrix of n×n (n is a positive integer). This masking parameter is the parameter by which the difference between the colorimetric value of output patch data and the input value of that patch data is decreased, and which is usually determined by using an arithmetic operation such as the method of least squares. The processing speed of this method is low compared to that of the color processing using "CPM1", FIG. 17A, since he amount of calculations is somewhat increased.

A method of forming "CPM3" in the fifth embodiment is described below with reference to FIG. 21. "CPM3" is the processing which is prepared as a color processing method for "QUALITY" and in which the quality as its objective is given priority. That is, RGB values as input values are converted into L*a*b* values. CMYK values are then obtained using the L*a*b* values as input values by referring to LUT. As mentioned earlier, the LUT is formed in accordance with the correspondence between the colorimetric value of output patch data and the input value of that patch data. The method using LUT is optimum in performing a real, high-quality color reproduction. In practice, however, no high-speed processing is expected since it is necessary to perform interpolation calculations or the like when a value not entered into the LUT is input.

As discussed above, in the fifth embodiment "CPM1" to "CPM3" are prepared as the three different CPMs, but "CPM3" alone is indispensable in LUT. This makes an optimum color reproduction possible without using three different LUTs.

Note that "CPM1" to "CPM3" as described in the fifth embodiment are not limited to those discussed above. That is, each CPM can be any method as long as the method has a favorable feature in respect of the processing speed or in the color space compression quality. In addition, the number of CPMs is not limited to three. Also, the fifth embodiment can be practiced either independently of or simultaneously with the first to fourth embodiments.

6th Embodiment

The sixth embodiment is described below with reference to FIG. 26. An apparatus arrangement in the sixth embodiment is identical with that of the first embodiment, and a detailed description thereof will be omitted.

In each of the first to fifth embodiments, the LUT stored in the color processing method storage unit 16 is used to perform color processing. Therefore, selection of a color processing method on the basis of a print mode or a recording medium has been previously described.

In contrast to this, according to the sixth embodiment, color gamut compression (color space compression) is performed by a matrix calculation. As shown in FIG. 26, color gamut data gamut1 to gamut9 corresponding to the modes based on the combinations of print modes and the types of recording media are stored in advanced in a color processing method storage unit 16. Color gamut compression is set on the basis of the color gamut data corresponding to the selected mode.

Note that color gamut compression may be set on the basis of the color gamut of an input unit or the color gamut of an input image in addition to the color gamut data corresponding to the mode of the output unit.

A LUT may be formed on the basis of the set color gamut compression.

In the image processing apparatuses according to the first to sixth embodiments, the color processing unit 14 is incorporated into the developing unit 13. However, the present invention is not restricted to this arrangement. For example, the color processing unit 14 can be a separate unit or incorporated into some other unit.

The present invention can be applied to a head which ejects droplets by causing film boiling with thermal energy, and to a recording method using this head.

In each of the above embodiments, color space compression is taken as an example of the color space processing. However, the present invention is not limited to these embodiments, so color space enlargement can also be used as the color space processing.

Note that the present invention is applicable to a system comprising a plurality of devices or to an apparatus consisting of only one device. Also, it is of course possible to apply the present invention to the case in which the invention is achieved by supplying programs to a system or an apparatus.

In the above embodiments, the color reproduction range of an image is identical with that of a source device such as a monitor. However, the color reproduction ranges of an input image can be set by detecting the color distribution of each input image by using, e.g., a three-dimensional histogram.

According to the present invention as has been discussed above, color processing methods including color space compression is selectively used in accordance with the output method selected in the image processing apparatus. This allows an optimum color reproduction and makes it possible to obtain an ideal output.

It is also possible to obtain an optimum color reproduction corresponding to the recording medium used in image formation. Furthermore, an optimum color reproduction is obtained in accordance with the forward scan and the backward scan of the head of the image output apparatus. Consequently, an ideal output is attained.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:

storing means for storing a plurality of color gamut mapping methods set in accordance with a plurality of color gamuts which are represented in a color space having three dimensions and respectively corresponding to a plurality of image forming methods;

selecting means for selecting one of the plurality of image forming methods in accordance with a manual operation;

color gamut mapping means for mapping input image data into a color gamut corresponding to a selected image forming method using a color gamut mapping method which corresponds to the selected image forming method; and image forming means for forming a color image corresponding to mapped image data in accordance with the selected image forming method.

2. The apparatus according to claim 1, wherein the image forming methods are different in image output speed.

3. The apparatus according to claim 1, further comprising:

input means for receiving command data from an external apparatus in order to select the image forming method; and analyzing means for analyzing the input command.

4. The apparatus according to claim 1, wherein said selecting means selects the image forming method in accordance with the manual selection being performed using an operation unit.

5. The apparatus according to claim 1, wherein said image forming means forms the color image on a recording medium.

6. The apparatus according to claim 5, wherein said selecting means selects the image forming method and a kind of the recording medium, and said color gamut mapping means uses the color gamut mapping method in accordance with the image forming method and the kind of the recording medium selected by said selecting means.

7. The apparatus according to claim 6, wherein the plurality of color gamut mapping methods may the input image data into different color gamuts using a same algorithm.

8. The apparatus according to claim 5, wherein said image forming means includes a head which ejects droplets of a liquid by causing film boiling with thermal energy.

9. The apparatus according to claim 1, wherein said color gamut mapping means compresses a color gamut on the basis of a color gamut of an input device.

10. The apparatus according to claim 1, wherein said color gamut mapping means compresses a color gamut on the basis of a color gamut of an input image which is present.

11. An image forming apparatus comprising:

storing means for storing a plurality of color gamut mapping methods set in accordance with a plurality of color gamuts which are represented in a color space having three dimensions and respectively corresponding to a plurality of combinations composed of an image forming method and a kind of a recording medium;

selecting means for selecting one of the plurality of combinations;

color gamut mapping means for mapping input image data into a color gamut corresponding to a selected combination by using a color gamut mapping method which corresponds to the selected combination; and image forming means for forming a color image corresponding to mapped image data on the kind of recording medium which is selected by said selecting means, in accordance with the selected combination.

12. The apparatus according to claim 11, further comprising:

input means for receiving command data from an external apparatus in order to select the recording medium; and analyzing means for analyzing the input command.

13. The apparatus according to claim 11, wherein said selecting means selects the kind of the recording medium in accordance with a manual operation from an operation unit.

14. The apparatus according to claim 11, wherein said color gamut mapping means maps a color gamut within different color gamuts on the basis of a same algorithm.

15. The apparatus according to claim 11, wherein said color gamut mapping means maps a color gamut on the basis of a color gamut of an input device.

16. The apparatus according to claim 11, wherein said color gamut mapping means maps a color gamut on the basis of a color gamut of an input image which is present.

17. The apparatus according to claim 11, wherein the recording media include coated paper.

18. The apparatus according to claim 11, wherein the recording media include an OHP sheet.

19. The apparatus according to claim 11, wherein the recording media include plain paper.

20. The apparatus according to claim 11, wherein said image forming means includes a head which ejects droplets of a liquid by causing film boiling with thermal energy.

21. An image processing method comprising the steps of:

storing a plurality of color gamut mapping methods set in accordance with a plurality of color gamuts which are represented in a color space having three dimensions and respectively corresponding to a plurality of image forming methods;

selecting one of the plurality of image forming methods in accordance with a manual operation;

mapping input image data into a color gamut corresponding to a selected image forming method by using a color gamut mapping method which corresponds to the selected image forming method; and outputting a color image corresponding to mapped image data in accordance with the selected image forming method.

22. An image processing method comprising the steps of:

storing a plurality of color gamut mapping methods set in accordance with a plurality of color gamuts which are represented in a color space having three dimensions and respectively corresponding to a plurality of combinations composed of an image forming method and a kind of a recording medium;

selecting one of the plurality of combinations;

mapping input image data into a color gamut corresponding to a selected combination by using a color gamut mapping method which corresponds to the selected combination; and outputting a color image corresponding to mapped image data on the kind of recording medium which is selected in the selecting step, in accordance with the selected combination.

* * * * *

UNITED STATES PATENT AND TRADEMARK OFFICE
CERTIFICATE OF CORRECTION

PATENT NO. : 6,104,829
DATED : August 15, 2000
INVENTOR(S) : NOBUYUKI NAKAJIMA It is certified that error appears in the above-identified patent and that said Letters Patent is hereby corrected as shown below:

COLUMN 1

Line 40, "into" should read --to--; and
    Line 46, "tie" should read --the--.

COLUMN 5

Line 57, "as LUT" should read --as a LUT--;
    Line 59, "using LUT" should read --using a LUT--; and
    Line 63, "LUT" should read --a LUT--.

COLUMN 6

Line 1, "Y1," should read --Y1--.

COLUMN 9

Line 14, "is-color" should read --is color--; and
    Line 17, "perform" should read --performed--.

UNITED STATES PATENT AND TRADEMARK OFFICE
CERTIFICATE OF CORRECTION

PATENT NO.     : 6,104,829
DATED          : August 15, 2000
INVENTOR(S)    : NOBUYUKI NAKAJIMA It is certified that error appears in the above-identified patent and that said Letters Patent is hereby corrected as shown below:

COLUMN 15

Line 52, "using LUT" should read --using a LUT--; and
Line 59, "in LUT." should read --in a LUT.--.

Signed and Sealed this

Fifteenth Day of May, 2001

Attest:

NICHOLAS P. GODICI

Attesting Officer     Acting Director of the United States Patent and Trademark Office